(12) United States Patent
Yoshioka et al.

(10) Patent No.: US 8,066,094 B2
(45) Date of Patent: Nov. 29, 2011

(54) ELECTRIC POWER STEERING DEVICE

(75) Inventors: Kazuya Yoshioka, Kashiwara (JP);
Yasuyuki Yoshii, Souraku-gun (JP);
Kenji Higashi, Tenri (JP); Shimon Jimbo, Kashiwara (JP); Masami Naka, Yamatokoriyama (JP); Shiro Nakano, Minamikawachi-gun (JP)

(73) Assignee: JTEKT Corporation, Osaka-shi (JP)

( * ) Notice: Subject to any disclaimer, the term of this patent is extended or adjusted under 35 U.S.C. 154(b) by 693 days.

(21) Appl. No.: 12/112,439

(22) Filed: Apr. 30, 2008

(65) Prior Publication Data
US 2008/0277193 A1    Nov. 13, 2008

(30) Foreign Application Priority Data

May 8, 2007  (JP) ................................. 2007-123695
Jun. 18, 2007 (JP) ................................. 2007-160219

(51) Int. Cl.
*B62D 5/14* (2006.01)
*B62D 5/04* (2006.01)
*B62D 6/10* (2006.01)

(52) U.S. Cl. ........................ 180/446; 180/443; 701/41
(58) Field of Classification Search ................ 180/443, 180/446; 701/41
See application file for complete search history.

(56) References Cited

U.S. PATENT DOCUMENTS

| | | | | |
|---|---|---|---|---|
| 4,715,461 A * | 12/1987 | Shimizu | ......................... | 180/446 |
| 5,919,241 A * | 7/1999 | Bolourchi et al. | ............. | 701/41 |
| 6,050,360 A * | 4/2000 | Pattok et al. | .................. | 180/446 |
| 6,615,152 B2 * | 9/2003 | Fujimoto et al. | ................ | 702/94 |
| 6,994,181 B2 * | 2/2006 | Asada | ........................... | 180/446 |
| 7,012,399 B2 * | 3/2006 | Suzuki | ......................... | 318/661 |
| 7,021,418 B2 * | 4/2006 | Tominaga et al. | ............ | 180/444 |
| 7,040,450 B2 * | 5/2006 | Nagase et al. | ................ | 180/443 |
| 7,268,988 B2 * | 9/2007 | Tsutsui | ........................... | 361/31 |
| 7,295,907 B2 * | 11/2007 | Lu et al. | ......................... | 701/41 |
| 7,431,117 B2 * | 10/2008 | Ito | ................................. | 180/204 |
| 7,538,514 B2 * | 5/2009 | Mir | .............................. | 318/799 |
| 2002/0124663 A1 * | 9/2002 | Tokumoto et al. | ........ | 73/862.333 |
| 2002/0143450 A1 * | 10/2002 | Fujimoto et al. | ................ | 701/43 |
| 2004/0128042 A1 * | 7/2004 | Takahashi et al. | .............. | 701/41 |
| 2004/0148080 A1 * | 7/2004 | Ekmark et al. | .................. | 701/41 |
| 2007/0107973 A1 * | 5/2007 | Jiang et al. | .................... | 180/443 |

FOREIGN PATENT DOCUMENTS

| | | |
|---|---|---|
| DE | 100 33 810 A1 | 1/2002 |
| DE | 102 53 465 A1 | 1/2004 |
| DE | 102 55 751 A1 | 6/2004 |
| EP | 1 916 176 A1 | 4/2008 |
| JP | 2004-1626 | 1/2004 |
| JP | 2005-145436 | 6/2005 |
| WO | WO 2007/024157 A1 | 3/2007 |

* cited by examiner

*Primary Examiner* — Joanne Silbermann
*Assistant Examiner* — Daniel Yeagley
(74) *Attorney, Agent, or Firm* — Oblon, Spivak, McClelland, Maier & Neustadt, L.L.P.

(57) ABSTRACT

A steering shaft is composed of an upper shaft, a lower shaft, an input shaft, and an output shaft. The upper shaft, the lower shaft, and the input shaft can rotate together, and the input shaft and the output shaft are relatively rotatably coupled to each other via a torsion bar. The rotational position of a rotor coupled to the output shaft is calculated based on the detected rotational position of the lower shaft and a steering torque detected based on the amount of relative rotational displacement of the input shaft and the output shaft. Thus, it is not necessary to include a rotor rotational position detecting unit for detecting the rotational position of the rotor within the electric motor, which reduces the size of the electric motor.

8 Claims, 6 Drawing Sheets

ELECTRIC POWER STEERING DEVICE

INCORPORATION BY REFERENCE

The disclosures of Japanese Patent Applications No. 2007-123695 filed on May 8, 2007 and No. 2007-160219 filed on Jun. 18, 2007 including the specifications, drawings and abstracts are incorporated herein by reference in their entirety.

BACKGROUND OF THE INVENTION

1. Field of the Invention

The invention relates to an electric power steering device used in a vehicle such as an automobile or the like.

2. Description of the Related Art

An electric power steering device of so-called direct drive type, with an electric motor whose output torque is directly transmitted to a steering shaft without the intervention of a reduction gear mechanism, is described in, for example, Japanese Patent Application Publication No. 2005-145436 (JP-A-2005-145436).

An electric power steering device is equipped with an electric motor to provide assistance in steering. Generally, there is limited space within the vehicle to place the electric power-steering device; it is therefore desirable to make the electric power steering device compact. However, the output torque of the electric motor in direct-drive type electric power-steering devices is not amplified by the reduction gear mechanism, which necessitates the use of a high-output electric motor in direct-drive type electric power-steering devices. Accordingly, the motor used in direct drive type electric power steering devices is often bulky. The need to use a bulky electric motor conflicts with preference for more compact electric power steering devices.

In Japanese Patent Application Publication No. 2004-1626 (JP-A-2004-1626), an electric power steering device equipped with an electric motor coaxially coupled to a steering shaft is described. The electric motor is equipped with a rotor and a stator, and the stator is held within a motor housing. The motor housing includes a stator holding portion and a bearing holding portion that are integrally formed of a single member. The motor housing supports part of the steering shaft via a bearing held by the bearing holding portion.

For example, the stator holding portion and the bearing holding portion may be integrally formed by pressing a single steel plate. Manufacturing the motor housing in this manner reduces both the weight and cost of the housing. However, by forming the motor housing through pressing, there is a maximum limit to the thickness of the plate that can be produced via pressing. Therefore, it may be impossible to ensure sufficient strength of the bearing holding portion. In this case, the motor housing may become unable to stably support the bearing and the steering shaft due to the flexure of the bearing holding portion or the like. As a result, the wobble of the steering shaft and vibrations or noise resulting from the wobble may occur.

SUMMARY OF THE INVENTION

The invention reduces the size of an electric power steering device. The invention also provides an electric power steering device that reduces vibrations or noise and/or has a reduced weight.

A first aspect of the invention relates to a vehicular steering device that includes an input shaft having a steering member coupled to one end of the input shaft; an output shaft coupled to the other end of the input shaft via a torsion bar; a steering torque sensor that detects a steering torque based on an amount of relative rotational displacement between the input shaft and the output shaft; an electric motor that provides steering assist and includes a rotor coaxially mounted on the output shaft that rotates together with the output shaft; an input shaft rotational position sensor that detects a rotational position of the input shaft; and a rotor rotational position calculating unit that calculates the rotational position of the rotor based on the rotational position of the input shaft detected by the input shaft rotational position detecting unit and the steering torque detected by the steering torque detecting unit.

According to the first aspect of the invention, the rotational position of the rotor may be detected using the output of the input shaft rotational position sensor and the output of the steering torque sensor. That is, there is no need to dispose a rotor rotational position sensor for detecting the rotational position of the rotor inside the electric motor, thereby reducing the size of the electric motor in the axial direction. As a result, the vehicular steering device may be reduced in size. The input shaft rotational position sensor may be disposed facing the input shaft in a radial direction thereof. In this case, by disposing the input shaft rotational position sensor in an ample space around the input shaft, the vehicular steering device may further be reduced in size with the efficient use of the space around the input shaft.

A second aspect of the invention relates to an electric power steering device constructed as follows. The electric power steering device is equipped with an electric motor for transmitting a steering assistance force to a steering shaft. The electric motor includes an annular rotor provided coaxially with the steering shaft and that rotates together with the steering shaft; an annular stator radially facing the rotor; and a motor housing that accommodates the rotor and the stator. The motor housing has a relatively thin tubular portion to which the stator is fixed, a relatively thick end member fixed to an end of the tubular portion, and a bearing holding portion provided on the end member. The electric power steering device is characterized in that the steering shaft is rotatably supported by a bearing held by the bearing holding portion.

According to the second aspect of the invention, the tubular portion is relatively thin. Therefore, although the end member is relatively thick, the motor housing may be reduced in weight or size as a whole. On the other hand, the end member is relatively thick. Therefore, the strength of the end member is sufficiently ensured. Accordingly, the motor housing can stably support the bearing and the steering shaft. As a result, wobbling of the steering shaft or vibrations or noise resulting from the wobbling is prevented. That is, in the second aspect of the invention, the occurrence of vibrations or noise can be prevented, and the motor housing can be reduced in weight. The tubular portion is thin, but is reinforced by the stator fixed to an inner periphery thereof. Therefore, the electric motor is ensured of a sufficient strength as a whole.

In the second aspect of the invention, the steering shaft may be, for example, coupled to a steering member such as a steering wheel or the like, or a pinion shaft or a rack shaft of a rack-and-pinion mechanism as a steering mechanism. That is, the electric power steering device according to the invention may be of so-called column assist type, so-called pinion assist type, so-called rack assist type, or another type.

The tubular portion may be formed of a material containing iron, and the end member may be formed of a material containing aluminum. In this case, the tubular portion is formed of the material containing iron, which exhibits a relatively high strength. Therefore, the tubular portion is ensured of a sufficient strength despite the thinness thereof. The material containing aluminum is relatively light. Therefore, weight of the end member may be reduced while maintaining a sufficient strength.

In the second aspect of the invention, an intermediate member rotatably supported by a bracket that is mounted on a vehicle body via a tilt strut, and a flange extended radially outward from an end of the tubular portion may be provided, and the intermediate member, the end member, and the flange may be fastened together by a common fixing screw inserted through these three components with the end member interposed between the intermediate member and the flange.

In this case, by fixing the intermediate member, the end member, and the flange using the common fixing screw, the man-hours required to assemble the electric power steering device may be reduced. By fixing the above-described three components integrally, the end member is reinforced by the intermediate member and the flange. Therefore, the bearing and the steering shaft are more stably held by the end member. Thus, the occurrence of vibrations or noise is more reliably prevented.

The end member may have a tubular protrusion fitted to the inner periphery of the tubular portion. In this case, by fitting the tubular protrusion of the end member to the inner periphery of the tubular portion, the end member may be accurately positioned with respect to the tubular portion of the motor housing.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

Figure 1:
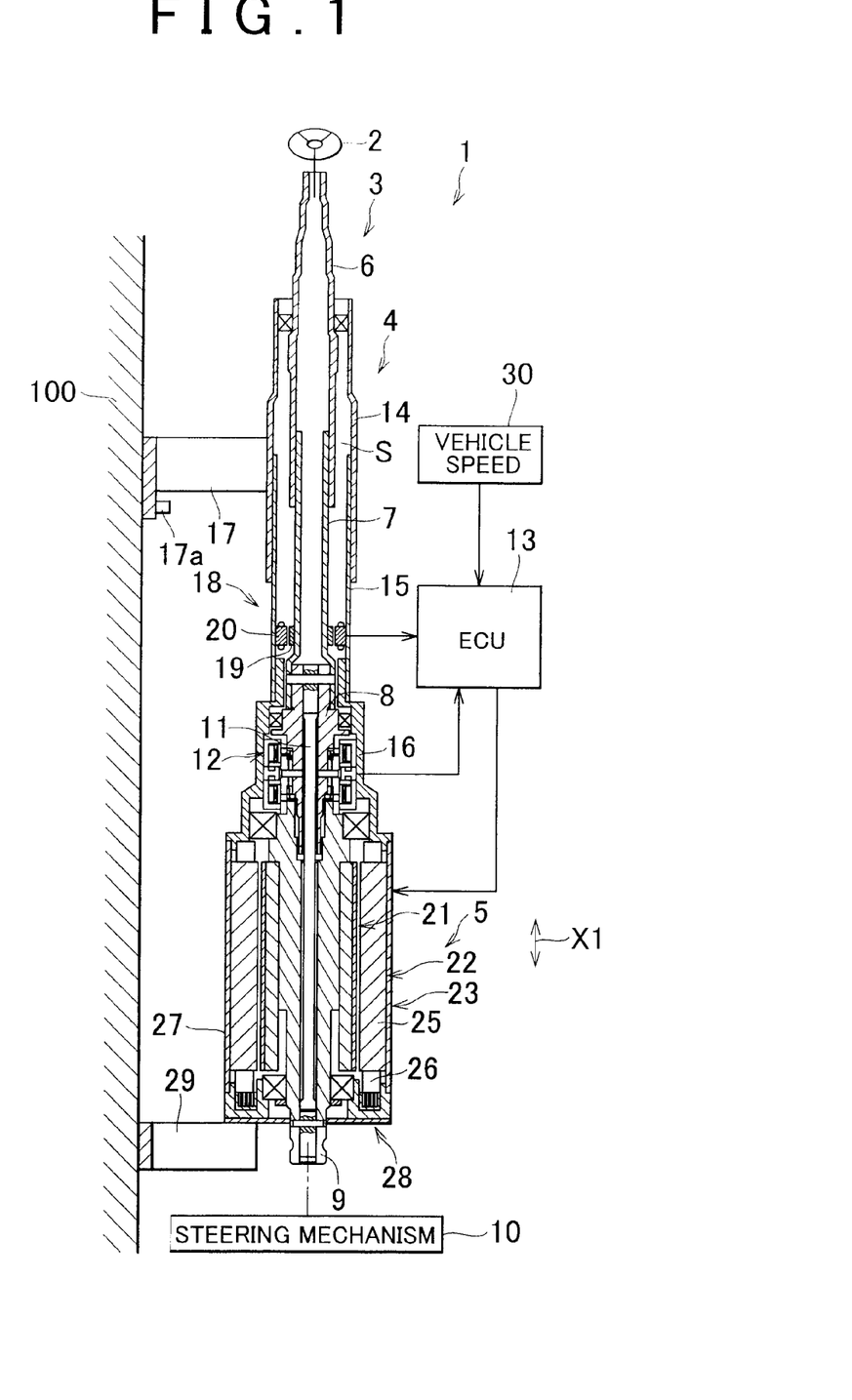
FIG. 1 is a cross-sectional view showing the schematic construction of an electric power steering device according to a first embodiment of the invention.
Figure 2:
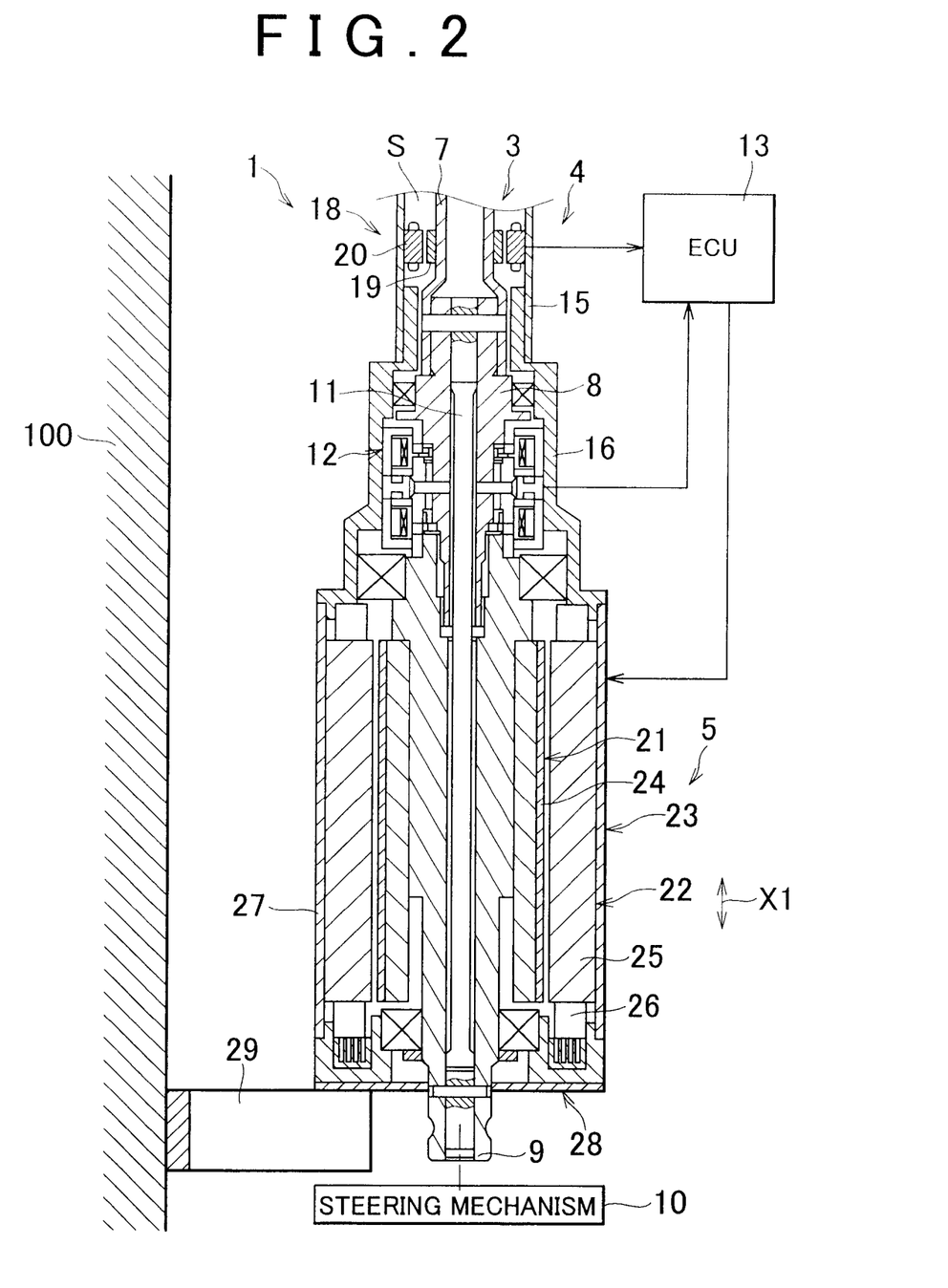
FIG. 2 is a cross-sectional view of part of the electric power steering device on an enlarged scale.
Figure 3:
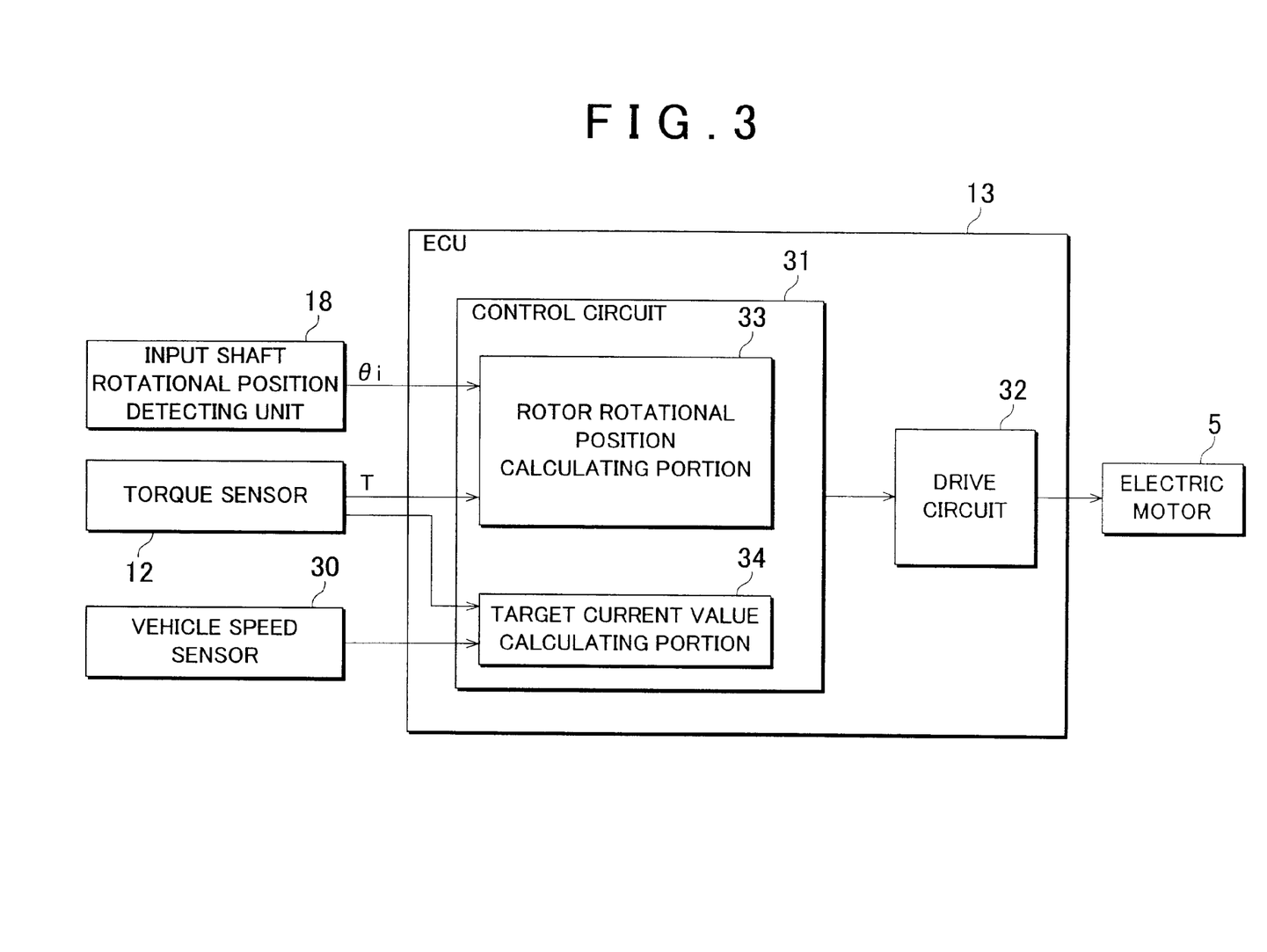
FIG. 3 is a block diagram regarding the control of an electric motor by an ECU.

The first embodiment of the invention will be described hereinafter with reference to FIGS. 1 to 3. FIG. 1 is a cross-sectional view showing the schematic construction of an electric power steering device 1 according to one embodiment of the invention. FIG. 2 is a cross-sectional view of part of the electric power steering device I on an enlarged scale. Referring to FIG. 1, the electric power steering device 1 is includes a steering shaft 3 to which a steering member 2 such as a steering wheel is attached; a tubular steering column 4 that rotatably supports the steering shaft 3; and an electric motor 5 that provides steering assist that is coaxially coupled to the steering shaft 3.

The steering shaft 3 is composed of a plurality of rectilinearly extending shafts. That is, the steering shaft 3 is composed of, for example, an upper shaft 6, a lower shaft 7, an input shaft 8, and an output shaft 9. The respective shafts 6 to 9 are rectilinearly extending tubular shafts disposed on the same axis. The steering member 2 is attached at one end (the upper end in FIG. 1) of the upper shaft 6 and, thus, rotates together with the upper shaft 6. A steering mechanism 10 such as, for example, a rack-and-pinion mechanism, is coupled to one end (a lower end in FIG. 1) of the output shaft 9 via an intermediate shaft (not shown) or the like. The steering member 2 is mechanically coupled to the steering mechanism 10 via the steering shaft 3.

In the following description, the direction towards the steering member 2 side, which extends along the axial direction X1 of the steering shaft 3, will be referred to as "above", and the direction towards the steering mechanism 10 will be referred to as "below". The upper end of the lower shaft 7 may be spline fitted to the inner periphery of the lower end of the upper shaft 6. The upper shaft 6 and the lower shaft 7 are coupled to each other so as to be rotatable together and movable relative to each other in the axial direction X1 of the steering shaft 3.

On the other hand, the input shaft 8 is relatively rotatably coupled the output shaft 9 via a torsion bar 11. The torsion bar 11 is inserted through the inner peripheries of the input shaft 8 and the output shaft 9. An upper end and a lower end of the torsion bar 11 are coupled to the input shaft 8 and the output shaft 9 respectively such that the torsion bar 11 rotates together with the input shaft 8 and the output shaft 9. The lower end of the input shaft 8 is loosely fitted to an inner periphery of the upper end of the output shaft 9. The upper end of the input shaft 8 is coupled to the lower end of the lower shaft 7. The input shaft 8 and the lower shaft 7 rotate together. That is, the upper shaft 6, the lower shaft 7, and the input shaft 8 rotate together. In this embodiment of the invention, these three shafts 6 to 8 function as an input shaft.

When a rotational torque (steering torque) around an axis of the input shaft 8 is input via the steering member 2, the upper shaft 6, and the lower shaft 7, the torsion bar 11 transmits the rotational torque to the output shaft 9 while being elastically twisted by an amount proportional to the steering torque. Thus, the output shaft 9 rotates around its axis. A torque sensor 12 (a steering torque sensor), provided in the vicinity of the joint of the input shaft 8 and the output shaft 9, detects the steering torque input via the steering member 2 based on changes in magnetic resistance caused by relative rotation of the input shaft 8 and the output shaft 9. More specifically, the torque sensor 12 detects an amount ΔR of a change in magnetic resistance caused by relative rotation of the input shaft 8 and the output shaft 9, and determines the steering torque T based on the detected value and equation (1).

$$T = Ct * \Delta R \quad (Ct: \text{proportional constant}) \tag{1}$$

The amount ΔR of the change in magnetic resistance is proportional to an amount Δθ of relative rotational displacement of the input shaft 8 and the output shaft 9. Therefore, the amount ΔR of the change in magnetic resistance is expressed by in equation (2), using the amount Δθ of relative rotational displacement.

$$\Delta R = Cr * \Delta \theta = Cr(\theta i - \theta o) \tag{2}$$

Wherein Cr represents a proportional constant, θi represents the rotational position (absolute position) of the input shaft, and θo represents the rotational position (absolute position) of the output shaft.

Accordingly, when equation (2) is substituted for the equation (1), an equation (3) is obtained.

$$T=C(\theta i-\theta o)(C=Ct*Cr) \quad (3)$$

The torque detected by the torque sensor 12 is input to an electronic control unit 13 (ECU). When the steering member 2 is operated (rotated), the respective shafts 6 to 9 rotate in the same direction while the input shaft 8 and the output shaft 9 rotate relative to each other. The rotation is then transmitted to a pinion (not shown) and converted into axial movement of a rack (not shown) in mesh with the pinion. Thus, the turning wheels (not shown) are turned.

The steering column 4 includes a rectilinearly extending tubular upper column 14, a rectilinearly extending tubular lower column 15, and a tubular sensor housing 16 whose inner periphery accommodates the torque sensor 12. The upper column 14, the lower column 15, and the sensor housing 16 are disposed on the same axis. The upper column 14 and the lower column 15 are relatively movably coupled to each other in an axial direction of the steering column 4 (in the same direction as the axial direction X1 in FIG. 1). When the upper column 14 and the lower column 15 are moved relative to each other in the axial direction X1, resistance is applied to one or both of the upper column 14 and the lower column 15. An upper end of the sensor housing 16 is fitted to an inner periphery of the lower column 15 at a lower end thereof. The sensor housing 16 and the lower column 15 are fixed to each other.

The steering shaft 3 is inserted through inner peripheries of the upper column 14, the lower column 15, and the sensor housing 16. The steering shaft 3 is rotatably supported by the steering column 4 via a plurality of bearings. A hollow, annular space S located around the steering shaft 3, surrounded by the upper column 14 and the lower column 15, and extending in the axial direction X1 is formed above the sensor housing 16 with respect to the axial direction X1. A lower end of the lower column 15 is fitted on an upper end of the sensor housing 16 to be stopped from moving downward.

The steering column 4 is fixed with a predetermined fixing strength to a vehicle body-side member 100 via a first bracket 17 fixed to the upper column 14. More specifically, the first bracket 17 is mounted on the vehicle body-side member 100 via, for example, a breakable pin 17a made of synthetic resin. When an impact of a magnitude equal to or larger than a predetermined value is applied to the first bracket 17 upon collision of a vehicle, the pin 17a breaks and the upper column 14 is released from the vehicle body-side member 100. As a result, the steering member 2, the upper shaft 6, the upper column 14, and the like move away from the vehicle body-side member 100 and downward in the axial direction X1 with respect to the vehicle body-side member 100.

An input shaft rotational position sensor 18 for detecting the rotational position (absolute position) of the lower shaft 7 is disposed on the inner periphery of the lower column 15. More specifically, an annular rotor 19 is coupled to an outer periphery of the lower shaft 7 such that the rotor 19 and the lower shaft 7 can rotate together, and a stator 20 is fixed to the inner periphery of the lower column 15 so as to surround the rotor 19. The input shaft rotational position sensor 18 includes the rotor 19 and the stator 20.

The input shaft rotational position sensor 18 detects the rotational position of the lower shaft 7 based on the amount of rotational displacement between the rotor 19 and the stator 20. By detecting the rotational position of the lower shaft 7, the input shaft rotational position sensor 18 detects the rotational position $\theta i$ of the input shaft 8. The rotational position ($\theta i$) detected by the input shaft rotational position sensor 18 is input to the ECU 13.

The input shaft rotational position sensor 18 is not restricted to the described embodiment. For example, other suitable rotational position sensor, such as a rotary encoder or the like, may be employed as the input shaft rotational position sensor 18. Referring to FIG. 2, the electric motor 5 according to this embodiment of the invention is a brushless motor. The electric motor 5 includes a tubular rotor 21 coaxially surrounding the steering shaft 3, an annular stator 22 coaxially surrounding the rotor 21, and a tubular motor housing 23 that accommodates the rotor 21 and the stator 22.

The rotor 21 has a plurality of permanent magnets 24 arranged on the outer peripheral portion thereof. The outer periphery of the rotor 21 has a magnetic pole alternately serving as a north pole and a south pole. The rotor 21 is coupled to the output shaft 9 such that the rotor 21 and the output shaft 9 rotate together. The output shaft 9 functions as a rotary shaft of the electric motor 5. The stator 22 includes an annular stator core 25, and a plurality of coils 26 wound around the stator core 25. The stator core 25 is held, at such a position that an inner peripheral face thereof faces an outer peripheral face of the rotor 21, by the motor housing 23. The stator core 25 includes an annular yoke, and a plurality of teeth protruding radially inward of the yoke from an inner periphery thereof. The plurality of the coils 26 is wound around the plurality of the teeth respectively. Each coil 26 is supplied with power from a power supply source (not shown). The supply of power to each coil 26 is controlled by the ECU 13.

The motor housing 23 includes a tubular peripheral wall portion 27 coaxially surrounding the steering shaft 3, and an annular lid member 28 fixed to the lower end of the peripheral wall portion 27. The stator core 25 is coaxially fixed to the inner peripheral face of the peripheral wall portion 27. The lower end of the sensor housing 16 is fixed to the upper end of the peripheral wall portion 27. The peripheral edge portion of the lid member 28 is fixed to the lower end of the peripheral wall portion 27. The output shaft 9 is inserted through an insertion hole provided at a central portion of the lid member 28. A second bracket 29 fixed to the vehicle body-side member 100 is fixed to the lid member 28. The motor housing 23 is fixed to the vehicle body-side member 100 by the second bracket 29.

The ECU 13 controls the electric motor 5. That is, the ECU 13 controls the electric motor 5 based on the steering torque detected by the torque sensor 12, the vehicle speed detected by a vehicle speed sensor 30 (see FIG. 1), and the like. In response to a control over the electric motor 5 executed by the ECU 13, an output torque as a steering assistance force is directly transmitted from the electric motor 5 to the steering shaft 3. Thus, the steering assistance force is transmitted to the steering mechanism 10, and steering assist is provided for the driver.

Next, the control of the electric motor 5 by the ECU 13 will be described in detail. FIG. 3 is a block diagram regarding the control of the electric motor 5 by the ECU 13. Referring to FIGS. 1 and 3, the ECU 13 includes a control circuit 31 that performs a predetermined calculation, and a drive circuit 32 that controls the supply of power to the electric motor 5. The control circuit 31 includes a rotor rotational position calculating portion 33 that calculates the rotational position (absolute position) of the rotor 21, and a target current value calculating portion 34 that calculates a target value of the current supplied to the electric motor 5.

The rotor rotational position calculating portion 33 calculates the rotational position of the rotor 21 based on the steering torque T input from the torque sensor 12 and the rotational position θi of the input shaft 8 input from the input shaft rotational position sensor 18. More specifically, the rotor rotational position calculating portion 33 calculates the rotational position θo of the output shaft 9 based on an equation (4), shown below, which is obtained through modification of equation (3), the input steering torque T, and the input rotational position θi.

$$\theta o = \theta i - T/C \quad (4)$$

That is, the rotational position θo of the output shaft 9 may be calculated based on the rotational position θi of the input shaft 8 and the steering torque T. In this embodiment, the rotor 21 and the output shaft 9 are coupled to each other so as to be rotatable together. Therefore, the rotational position of the rotor 21 may be calculated by calculating the rotational position θo of the output shaft 9.

On the other hand, the target current value calculating portion 34 calculates a magnitude of a steering assistance force transmitted from the electric motor 5 to the output shaft 9 (an output torque of the electric motor 5) based on a steering torque input from the torque sensor 12, a vehicle speed input from the vehicle speed sensor 30, and the like. The target current value calculating portion 34 then calculates a target current value proportional to the calculated magnitude of the steering assistance force.

The rotational position of the rotor 21 calculated by the rotor rotational position calculating portion 33 and the target current value calculated by the target current value calculating portion 34 are input to the drive circuit 32. The drive circuit 32 then supplies the electric motor 5 with a current of the target current value through, for example, pulse-width modulation (PWM) control. More specifically, a semiconductor switching element such as, for example, a field-effect transistor (FET) or the like is changed over between its ON state and its OFF state based on the rotational position of the rotor 21, and the energization state of the coils 26 is thereby controlled. The value of the current supplied to the electric motor 5 is detected by a current sensor (not shown), and the value of the current supplied to the electric motor 5 is corrected based on the detected current. The value of the current supplied to the electric motor 5 is thereby controlled to the target current value. Thus, the steering assist force of the magnitude calculated by the target current value calculating portion 34 is transmitted to the output shaft 9.

In the embodiment as described above, the rotational position of the rotor 21 is detected by the input shaft rotational position sensor 18, the torque sensor 12, and the ECU 13. That is, in this embodiment, there is no need to provide a device such as a resolver or the like to detect the rotational position of the rotor inside the electric motor. Therefore, the size of the electric motor 5 in the axial direction X1 may be reduced.

The input shaft rotational position sensor 18 for detecting the rotational position of the lower shaft 7, which constitutes a part of the input shaft, is disposed above the electric motor 5 in the axial direction X1 and in the hollow, annular space S between the lower shaft 7 and the lower column 15. This arrangement utilizes the available space more efficiently and allows further reductions in the size of the electric power steering device 1 in the axial direction X1.

The invention is not limited to the embodiment as described above, but may be embodied with various changes or modifications. For example, in the foregoing embodiment, the rotational position of the rotor 21 is calculated using equation (4). However, the rotational position of the rotor 21 may be calculated using any suitable method. For example, the rotational position of the rotor 21 may be calculated using a different equation, and a known torque sensor other than the aforementioned torque sensor may be employed as the torque sensor 12.

For example, if a torque sensor capable of directly detecting the amount Δθ of relative rotational displacement of the input shaft 8 and the output shaft 9 is employed, the rotational position of the rotor 21 may be calculated by subtracting the amount Δθ of relative rotational displacement from the detected rotational position θi of the input shaft 8 (θo=θi−Δθ). Thus, the rotational position of the rotor 21 is calculated with ease.

In the foregoing embodiment, the rotational position of the lower shaft 7 is detected by the input shaft rotational position sensor 18. However, the invention is not restricted to this example. For example, the input shaft rotational position sensor 18 may be disposed around the upper shaft 6 to detect the rotational position (absolute position) of the upper shaft 6. That is, it is appropriate for the input shaft rotational position detecting unit 18 to detect the rotational position of one of the shafts constituting the input shaft (the upper shaft 6, the lower shaft 7, or the input shaft 8). If a steering member rotational position sensor (corresponding to a steering angle sensor) for detecting the rotational position of the steering member 2 is provided, there is no need to provide the input shaft rotational position sensor 18. That is, the above-described steering member rotational position sensor may be employed as input shaft rotational position sensor.

In the foregoing embodiment of the invention, the example in which the invention is applied to the electric power steering device 1 of so-called column assist type, in which the output torque of the electric motor 5 is transmitted to the steering shaft 3. However, the invention is not limited to this example. For example, the invention may be applied to another vehicular steering device such as an electric power steering device of so-called pinion assist type or the like.

Figure 4:
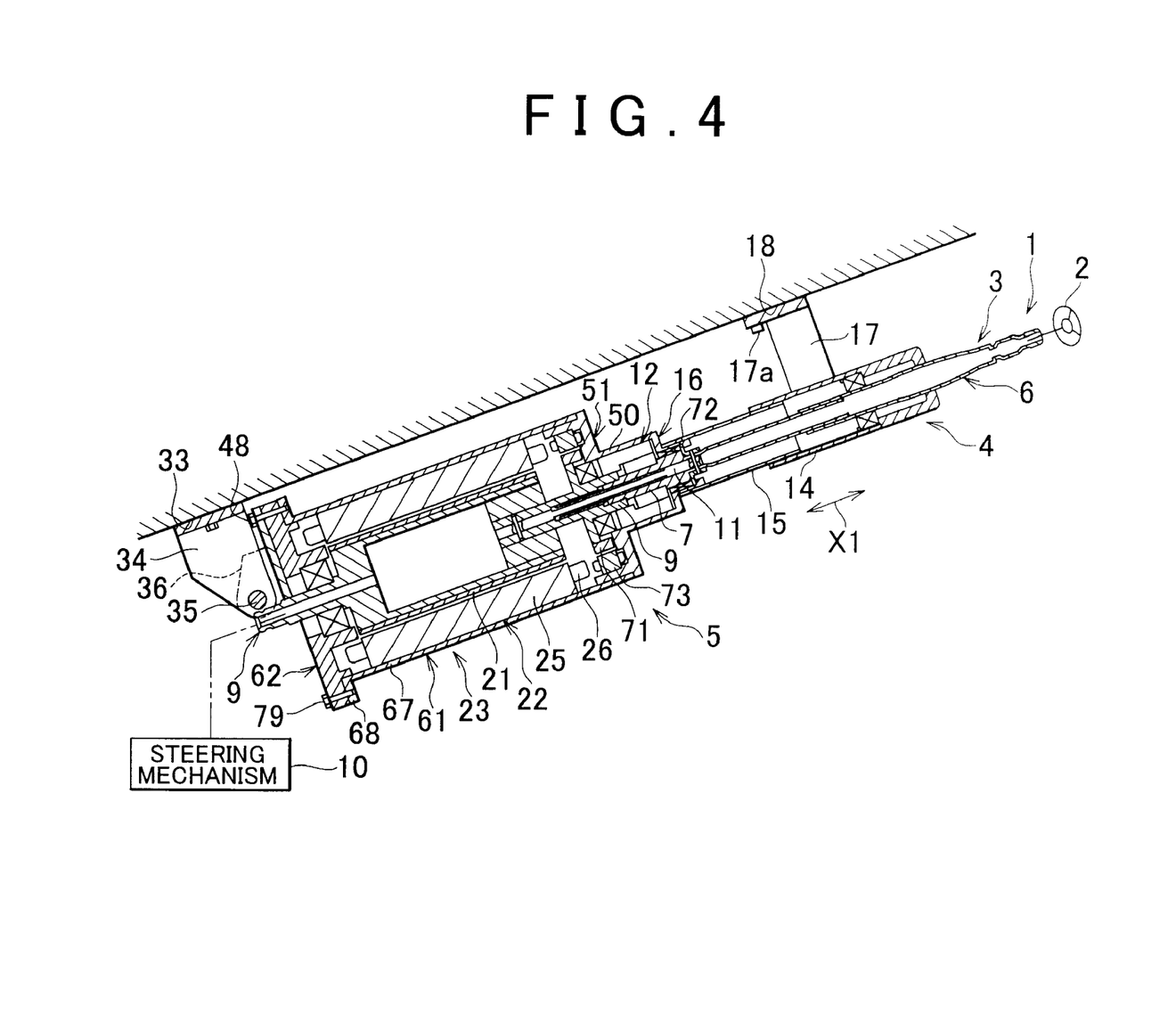
FIG. 4 is a cross-sectional view showing the schematic construction of an electric power steering device according to a second embodiment of the invention.

FIG. 4 is a cross-sectional view showing the schematic construction of the electric power steering device 1 according to a second embodiment of the invention. The contents identical to those of the first embodiment of the invention will not be described below.

Figure 5:
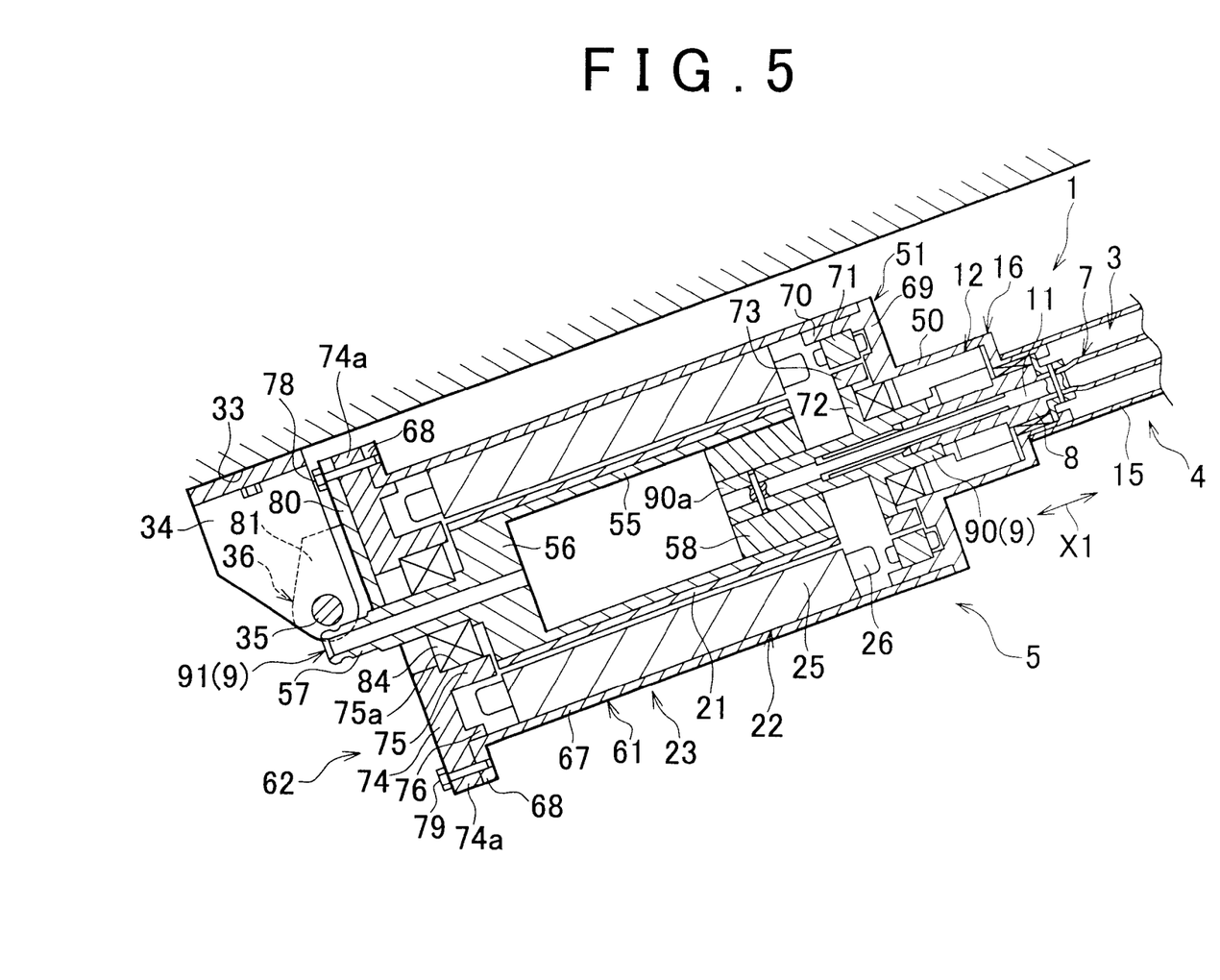
FIG. 5 is an enlarged view of part of FIG. 4 around an electric motor.

The sensor housing 16 includes a tubular portion 50, and an annular flange portion 51 extended radially outward on the lower end of the tubular portion 50. The torque sensor 12 is accommodated in the tubular portion 50 along an inner periphery thereof. The flange portion 51 is coupled to the motor housing 23 of the electric motor 5. The detail construction of the flange portion 51 will be described later. FIG. 5 is an enlarged view of part of FIG. 4 around the electric motor 5. Referring to FIG. 5, the electric motor 5 according to this embodiment is a brushless motor of so-called inner rotor type. The electric motor 5 is equipped with the annular rotor 21 provided coaxially with the steering shaft 3, the annular stator 22 surrounding the rotor 21, and the motor housing 23 for accommodating the rotor 21 and the stator 22.

The rotor 21 is constructed by annularly combining a plurality of permanent magnets. The outer periphery of the rotor 21 has a magnetic pole alternately serving as a north pole and a south pole. The rotor 21 is coupled to the outer peripheral face of a tubular portion 55, which constitutes a part of the output shaft 9. That is, the output shaft 9 includes a first shaft 90 and a second shaft 91. The second shaft 91 includes the tubular portion 55, which is equal in length to the rotor 21 with respect to the axial direction X1, an annular stage portion 56 extended radially inward of the tubular portion 55 from a lower end thereof, and a shaft portion 57 extending downward from a central portion of the annular stage portion 56. The tubular portion 55, the annular stage portion 56, and the shaft portion 57 are coaxially disposed. The rotor 21 is coaxially coupled to the outer peripheral face of the tubular portion 55 such that the rotor 21 and the tubular portion 55 can rotate together.

The lower end 90a of the first shaft 90 is located inside an inner periphery of the top end of the tubular portion 55. The lower end 90a of the first shaft 90 and the tubular portion 55 are coupled to each other via an annular intermediate member 58 such that the first shaft 90 and the tubular portion 55 can rotate together. That is, the rotor 21 and the first shaft 90 are coupled to each other so as to be rotatable together via the intermediate member 58 and the tubular portion 55. A hollow space may be formed along the inner periphery of the tubular portion 55. Thus, weight of the electric motor 5 is reduced.

The stator 22 includes the annular stator core 25, and the plurality of the coils 26 wound around the stator core 25. The stator core 25 surrounds the rotor 21 in a radially spaced manner. The stator core 25 includes an annular yoke and a plurality of teeth that protrude radially inward from the inner periphery of the yoke (not shown). The plurality of the coils 26 are wound around the plurality of the teeth respectively. Each coil 26 is supplied with power from a power supply source (not shown). The supply of power to each coil 26 is controlled by an ECU. When the ECU causes the power supply source to supply each coil 26 with power, a rotational torque is thereby transmitted from the rotor 21 to the output shaft 9. As a result, steering assist is provided to the driver.

The motor housing 23 includes a tubular main body portion 61 that has the inner periphery to which the stator 22 is fixed, and an end member 62 fixed to a lower end of the main body portion 61. The motor housing 23 is mounted on the vehicle via a lower fixing bracket 34 fixed to a fixing portion 33 of the vehicle, and an intermediate member 36 rotatably supported by the lower fixing bracket 34 via a tilt strut 35.

The main body portion 61 may be formed by, for example, plastically deforming a thin steel plate through pressing or the like. The main body portion 61 is equipped with a tubular portion 67 whose axial length is longer than the stator core 25, and an annular flange 68 that extends radially outward on the lower end of the tubular portion 67. The stator 22 may be, for example, press-fitted on an inner periphery of the tubular portion 67, and coaxially fixed to an axially intermediate region of the tubular portion 67. The flange portion 51 of the sensor housing 16 is fixed to an upper end of the tubular portion 67.

The flange portion 51 includes an annular plate portion 69 that extends radially outward from the lower end of the tubular portion 50 of the sensor housing 16, and a tubular protrusion 70 that extends downward from the annular plate portion 50 at a position close to an outer periphery thereof. By, for example, press-fitting this tubular protrusion 70 into the tubular portion 67 of the motor housing 23 along the inner periphery thereof, the flange portion 51 may be fixed to the upper end of the tubular portion 67. The tubular protrusion 70 of the sensor housing 16 is fitted to the tubular portion 67 of the motor housing 23, and holds a resolver stator 71 on an inner periphery thereof. A resolver for detecting the rotational position of the rotor 21 is constructed of this resolver stator 71 and a resolver rotor 73 held by an annular plate portion 72 of the first shaft 90. The resolver stator 71 and the resolver rotor 73 are separated by a gap, and the resolver stator 71 surrounds the resolver rotor 73. By detecting the rotational position of the output shaft 9 rotating together with the rotor 21, the resolver can detect the rotational position of the rotor 21.

The rotational position sensor is not limited to the resolver. Any suitable sensor, such as a rotary encoder or the like, may be employed as the rotational position sensor. In this embodiment, the electric motor 5 may be designed not only as a brushless motor of so-called inner rotor type but also as a brushless motor of so-called outer rotor type or a non-brushless motor.

Next, the end member 62 will be described. The end member 62 is a metal member formed by, for example, casting or cutting, and is thicker than the tubular portion 67. That is, the end member 62 includes an annular plate portion 74 that is thicker than the tubular portion 67 and fixed to the flange 68; an inner tube 75 that is thicker than the tubular portion 67 and that extends axially upward from the annular plate portion 74 at a position close to an inner periphery of the annular plate portion 74; and an outer tube 76 that extends axially upward from the annular plate portion 74 at a position toward the outer periphery of the annular plate portion 74. The inner tube 75 and the outer tube 76 are disposed coaxially with each other, and the end member 62 is formed of a material containing, for example, aluminum to reduce weight.

A region 74a of the annular plate portion 74 that is located radially outward of the outer tube 76 has substantially the same contour as the flange 68. The output shaft 9 is inserted through a central hole of the annular plate portion 74. The end member 62 is attached to the main body portion 61 from below such that the region 74a of the annular plate portion 74 is superposed on the annular flange 68. The region 74a of the annular plate portion 74 and the flange 68 are fixed to each other by a plurality of fixing screws 78 and 79.

More specifically, the fixing screws 78 and 79 are inserted through screw-holes formed in the region 74a of the annular plate portion 74 and the flange portion 68 in the axial direction X1. Fastened together by these fixing screws 78 and 79, the region 74a of the annular plate portion 74 and the flange 68 are fixed to each other. The intermediate member 36, rotatably supported by the lower fixing bracket 34, is fixed to the annular plate portion 74. That is, with the region 74a of the annular plate portion 74 interposed between the intermediate member 36 and the flange 68, the intermediate member 36, the region 74a of the annular plate portion 74, and the flange 68 are fastened together and fixed to one another by the common fixing screw 78, whose shaft portion is inserted through these three components 36, 74a, and 68 in the axial direction X1.

By fixing the intermediate member 36, the annular plate portion 74, and the flange 68 using the common fixing screw 78, the man-hours required to assemble the electric power steering device 1 may be reduced. By fixing the intermediate member 36 to the thick annular plate portion 74, the end member 62 may be stably fixed with respect to the vehicle body. The intermediate member 36 includes a plate portion 80 fixed to the annular plate portion 74, and a supported portion 81 rotatably supported via the tilt strut 35. The plate portion 80 is fixed to part of the annular plate portion 74 and superposed on the annular plate portion 74 in the axial direction X1.

On the other hand, the outer tube 76 is fitted in the tubular portion 67 at the lower end of the tubular portion 67. Because the outer tube 76 is fitted in the tubular portion 67 at the lower end of the tubular portion 67, the end member 62 is accurately positioned with respect to the tubular portion 67. That is, the inner peripheral face of the inner tube 75 is coaxially disposed with the inner peripheral face of the tubular portion 67. A bearing holding portion 75a that holds a bearing 84 is provided on the inner peripheral face of the inner tube 75. The end member 62 rotatably supports the shaft portion 57 of the output shaft 9 via the bearing 84 held by the bearing holding portion 75a. The end member 62 rotatably supports the output shaft 9 via the bearing 84, and rotatably supports the rotor 21 via the bearing 84 and the output shaft 9. By accurately positioning the end member 62 with respect to the tubular portion 67, the rotor 21 is accurately positioned with respect to the stator 22. Thus, the output of the electric motor 5 is stabilized.

In the second embodiment of the invention, sufficient thickness of the annular plate portion 74 and the inner tube 75 are ensured and hence a sufficient strength. Accordingly, the end member 62 can stably hold the bearing 84 and the output shaft 9, and can rotatably support the output shaft 9 stably.

Furthermore, in the second embodiment, the end member 62 as part of the motor housing 23 is thicker than the tubular portion 67. Therefore, an end member 62 of sufficient strength is ensured that can stably support the output shaft 9 via the bearing 84. Accordingly, the wobbling of the output shaft 9 or the occurrence of vibrations or noise resulting from the wobbling of the output shaft 9 is prevented. Part of the end member 62 (the region 74a of the annular plate portion 74) is reinforced by being sandwiched by the intermediate member 36 and the flange 68 in the axial direction X1. Therefore, the bearing 84 and the output shaft 9 are more stably held by the end member 62. Thus, the wobbling of the output shaft 9 and the occurrence of vibrations or noise resulting from the wobbling of the output shaft 9 is more reliably prevented.

On the other hand, the weight and thickness of the tubular portion 67 is reduced. Thus, the weight of the motor housing 23 as a whole may be reduced despite the large thickness of the end member 62. The tubular portion 67 is thinner than the end member 62, but is reinforced by the stator 22, which is fixed to the inner periphery the tubular portion 67. Therefore, an electric motor 5 of sufficient strength as a whole is provided. The tubular portion 67 may be thin, but is formed of the material (steel plate) containing iron, which exhibits a relatively high strength. Therefore, a tubular portion 67 of sufficient strength is provided.

By preventing the wobbling of the output shaft 9 as described above, the distance between the rotor 21 and the stator 22 in a radial direction of the electric motor 5 (a so-called air gap) may be reduced as well. That is, by preventing the wobbling of the output shaft 9 rotating together with the rotor 21, the wobbling of the rotor 21 may also be prevented. Thus, it is possible to prevent the rotor 21 from colliding with the stator 22 despite the narrow air gap. By reducing the air gap, the output of the electric motor 5 may be enhanced.

The invention is not limited to the contents of the foregoing embodiment described above, but may be modified in various ways. For example, the steering shaft may be a pinion shaft or a rack shaft of a rack-and-pinion mechanism as a steering mechanism, or a shaft of another type. That is, the electric power steering device according to the invention may be of so-called column assist type, so-called pinion assist type, so-called rack assist type, or another type.

In the foregoing embodiment of the invention, the example in which the end member 62 is fastened by the fixing screws 78 and 79 to the main body portion 61 is described. However, this is not the only method for fixing the end member 62 to the main body portion 61. For example, the end member 62 may be fixed to the main body portion 61 by any suitable method such as welding, press-fitting, adhesives, or the like.

Figure 6:
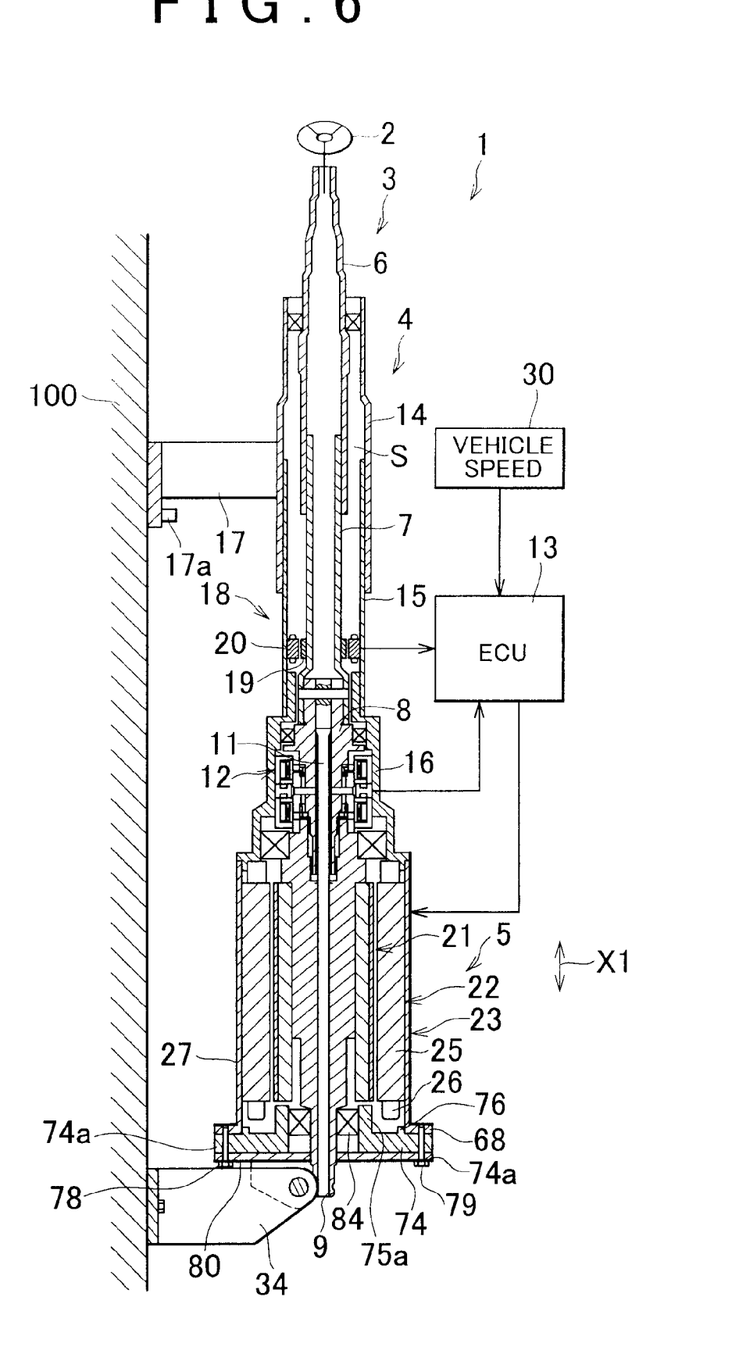
FIG. 6 is a cross-sectional view showing the schematic construction of an electric power steering device according to a modified second embodiment of the invention.

According to the first embodiment of the invention, the rotational position of the rotor is calculated based on the detected rotational position of the input shaft and the detected steering torque. In the second embodiment, the construction having the thick end member fixed to the end of the motor housing is described. However, the invention is not limited to the described embodiments. The second embodiment may be modified by disposing the input shaft rotational position sensor on the inner periphery of the lower column instead of the inner periphery of the motor housing and the rotational position of the rotor may be calculated based on the rotational position of the input shaft and the steering torque may be combined with the rotational position of the input shaft. FIG. 6 is a cross-sectional view showing the schematic construction of the electric power steering device 1 according to the modified second embodiment of the invention.

What is claimed is:

1. An electric power steering device comprising:
    an input shaft having a first end and a second end;
    a steering member that is attached to the first end of the input shaft;
    an output shaft coupled to the second end of the input shaft via a torsion bar;
    a steering torque sensor that detects a steering torque based on an amount of relative rotational displacement between the input shaft and the output shaft;
    an electric motor that provides steering assist and includes a rotor which is coaxially mounted on the output shaft and which rotates together with the output shaft;
    an input shaft rotational position sensor that detects a rotational position of the input shaft; and
    a rotor rotational position calculating unit that calculates an absolute rotational position of the rotor based on the detected rotational position of the input shaft and the detected steering torque.

2. The electric power steering device according to claim 1, wherein the input shaft rotational position sensor faces the input shaft in a radial direction thereof.

3. The electric power steering device according to claim 1, further comprising:
    an annular steering column that accommodates and rotatably supports the input shaft, wherein;
    the input shaft rotational position sensor is disposed between an outer circumferential surface of the input shaft and an inner circumferential surface of the annular steering column.

4. The electric power steering device according to claim 3, wherein the input shaft rotational position sensor has a sensor rotor and a stator, and the sensor rotor is fixed to the outer circumferential surface of the input shaft, and the stator is fixed to the inner circumferential surface of the steering column and surrounds the sensor rotor.

5. The electric power steering device according to claim 3, further comprising:
    an annular motor housing that accommodates the electric motor, wherein;
    the external diameter of the steering column is smaller than the external diameter of the annular motor housing.

6. The electric power steering device according to claim 5, further comprising:
    an annular sensor housing that accommodates the steering torque sensor, wherein;
    the steering torque sensor is disposed between the input shaft rotational position sensor and the electric motor in an axial direction of the input shaft, and
    the external diameter of the annular sensor housing is smaller than the external diameter of the annular motor housing.

7. The electric power steering device according to claim 1, wherein the electric motor includes the rotor, and a stator radially facing the rotor, and a motor housing that accommodates the rotor and the stator, the motor housing having a tubular portion which has a circumferential wall to which the stator is affixed, an end member, which is fixed to an end of the tubular portion and has a bearing holding portion, wherein a thickness of the end member in an axial direction of the tubular portion is thicker than a thickness of the circumferential wall of the tubular portion in a radial direction of the tubular portion, and wherein the output shaft is rotatably supported by a bearing held by the bearing holding portion.

8. The electric power steering device according to claim 1, further comprising a drive circuit that controls a supply of power to the electric motor based on the calculated absolute rotational position of the rotor.

* * * * *